United States Patent
Wang et al.

(10) Patent No.: US 12,085,501 B2
(45) Date of Patent: Sep. 10, 2024

(54) SPECTRAL CONFOCAL MEASUREMENT DEVICE AND MEASUREMENT METHOD THEREOF

(71) Applicant: ALEADER VISION TECHNOLOGY CO., LTD., Guangdong (CN)

(72) Inventors: Jinfeng Wang, Guangdong (CN); Yuan Luo, Guangdong (CN); Jing He, Jing (CN); Guanzhong Kou, Guangdong (CN)

(73) Assignee: ALEADER VISION TECHNOLOGY CO., LTD., Dongguan (CN)

( * ) Notice: Subject to any disclaimer, the term of this patent is extended or adjusted under 35 U.S.C. 154(b) by 0 days.

(21) Appl. No.: 17/753,395

(22) PCT Filed: Jun. 11, 2020

(86) PCT No.: PCT/CN2020/095524
§ 371 (c)(1),
(2) Date: Mar. 1, 2022

(87) PCT Pub. No.: WO2021/248398
PCT Pub. Date: Dec. 16, 2021

(65) Prior Publication Data
US 2023/0087237 A1    Mar. 23, 2023

(51) Int. Cl.
*G01N 21/31* (2006.01)

(52) U.S. Cl.
CPC ..... *G01N 21/31* (2013.01); *G01N 2201/0633* (2013.01); *G01N 2201/0635* (2013.01)

(58) Field of Classification Search
CPC ........... G01N 21/31; G01N 2201/0633; G01N 2201/0635
(Continued)

(56) References Cited

U.S. PATENT DOCUMENTS

2004/0109170 A1   6/2004  Schick
2008/0250255 A1  10/2008  Diab
(Continued)

FOREIGN PATENT DOCUMENTS

CN    101706405 A    5/2010
CN    104034268 A    9/2014
(Continued)

OTHER PUBLICATIONS

Weng Jui-Hong et al, "Confocal epifluorescence sensor with an arc-shaped aperture for slide-based PCR quantification", Biosensors and Bioelectronics, vol. 100, Aug. 24, 2017, pp. 71-78, XP085272684, ISSN:0956-5663, DOI:10.1016/J.BIOS. 2017.08.052.

*Primary Examiner* — Mohamed K Amara
*Assistant Examiner* — Omar H Nixon
(74) *Attorney, Agent, or Firm* — SHIMOKAJI IP

(57) ABSTRACT

A spectral confocal measurement device includes a light source portion, configured to emit a broad-spectrum light beam with a certain wavelength range in a first predetermined path; an optical sampling portion, configured to converge the broad-spectrum light beam emitted from the light source portion on different measurement surfaces of an object to be measured, and output a reflected light in a second predetermined path that is different from a reverse direction of the first predetermined path; and a measurement portion, configured to receive and process the reflected light from the optical sampling portion to obtain a measurement result. The device can improve measurement accuracy and reduce production costs. In addition, a spectral confocal measurement method is also provided.

9 Claims, 9 Drawing Sheets

(58) Field of Classification Search
USPC .......................................................... 356/328
See application file for complete search history.

(56) References Cited

U.S. PATENT DOCUMENTS

| | | | |
|---|---|---|---|
| 2010/0014081 A1* | 1/2010 | Huening | G01J 3/0289 |
| | | | 356/326 |
| 2017/0010096 A1* | 1/2017 | Xie | G01S 17/88 |

FOREIGN PATENT DOCUMENTS

| | | | | |
|---|---|---|---|---|
| CN | 104061901 | A | | 9/2014 |
| CN | 104995480 | A | | 10/2015 |
| CN | 105241850 | A | | 1/2016 |
| CN | 106405803 | A | | 2/2017 |
| CN | 106443996 | A | | 2/2017 |
| CN | 108981579 | A | | 12/2018 |
| CN | 109580640 | A * | | 4/2019 |
| CN | 109945800 | A | | 6/2019 |
| CN | 110095079 | A | | 8/2019 |
| CN | 110412758 | A | | 11/2019 |
| CN | 110849271 | A | | 2/2020 |
| CN | 210036602 | U | | 2/2020 |
| CN | 110887450 | A | | 3/2020 |
| CN | 111426287 | A | | 7/2020 |
| CN | 111486952 | A | | 8/2020 |
| DE | 10321896 | A1 | | 12/2004 |
| DE | 102012022304 | A1 | | 8/2013 |
| EP | 0950168 | B1 | | 8/2005 |
| EP | 1855083 | B1 | | 8/2011 |
| FR | 2805342 | A | | 8/2001 |
| JP | 2012002537 | A | | 1/2012 |
| JP | 2012093197 | A | | 5/2012 |
| JP | 2012189547 | A | | 10/2012 |
| JP | 2014528084 | A | | 10/2014 |
| WO | WO-2019243008 | A1 * | 12/2019 | ......... G01B 11/0608 |
| WO | 2020059677 | A1 | | 11/2021 |

* cited by examiner

SPECTRAL CONFOCAL MEASUREMENT DEVICE AND MEASUREMENT METHOD THEREOF

FIELD OF THE INVENTION

The invention relates to the technical field of optical displacement measurement, in particular to a spectral confocal measurement device and a measurement method thereof.

BACKGROUND OF THE INVENTION

In recent years, with the rapid development of precision manufacturing, the requirements for measurement technology have greatly increased. Spectral confocal sensor is a non-contact displacement sensor based on wavelength displacement modulation, which has become a hot research topic and been widely used in the fields of film thickness measurement, precision positioning, and precision instrument manufacturing, because its measurement accuracy reaches sub-micron or even nanometer level, and it is not sensitive to object tilt and surface texture, etc., it also has strong stray light resistance ability.

The spectral confocal measurement system based on spectral confocal technology uses a light source to irradiate the surface of the object to be measured, and reflected spectral information is detected by a CCD industrial camera or spectrometer, etc., to determine the peak wavelength focused on the surface of the object, thereby obtaining axial distance information of the surface of the object to be measured. The principle is to use a dispersive objective lens group to focus and disperse the light from the light source, and form a continuous monochromatic light focus on the optical axis with different distances to the dispersive objective lens group, thereby establishing a linear relationship between wavelength and axial distance, and then use the spectral information reflected by the surface of the object to be measured to obtain the corresponding position information.

FIG. 1 shows an existing spectral confocal measurement device. The light is emitted from the light source 1', enters the coupling portion 2' to be transmitted to the sampling portion 3', and then is projected to the measured object 4' which reflects a reflected light carrying measurement information to return back to the coupling portion 2' along the original light path. Subsequently, partial or all of the reflected light passes through the beam splitter 5', and is finally converted into an electrical signal by the sensor 6', thereby analyzing and obtaining location measurement results.

In this measurement device and method, since the reflected light returns to the light-incident hole along a reverse direction of the incident light path, the purity of the spectrum received by the light-incident hole is not high, which leads to deviations in measurement results and reduces measurement accuracy.

Therefore, there is an urgent need for an improved spectral confocal measurement device and measurement method to overcome the above shortcomings.

SUMMARY OF THE INVENTION

One objective of the present invention is to provide a spectral confocal measurement device, thereby improving measurement accuracy and reducing production cost.

Another objective of the present invention is to provide a spectral confocal measurement method, thereby improving measurement accuracy and reducing production cost.

To achieve the above-mentioned objective, the present invention provides a spectral confocal measurement device including:

a light source portion, configured to emit a broad-spectrum light beam with a certain wavelength range in a first predetermined path;

an optical sampling portion, configured to converge the broad-spectrum light beam emitted from the light source portion on different measurement surfaces of an object to be measured, and output a reflected light in a second predetermined path that is different from a reverse direction of the first predetermined path; and a measurement portion, configured to receive and process the reflected light from the optical sampling portion to obtain a measurement result.

Preferably, the light source portion includes a light source and a light source controller connected to the light source, and the optical sampling portion includes a light-incident hole, a dispersive objective lens group and a light-outgoing hole.

Preferably, the light source portion further includes a focusing lens located below the light source.

Preferably, the light source is a point light source configured to emit an annular light beam into the dispersive objective lens group in the first predetermined path to reach the measurement surface, under controls of the light source controller; and the second predetermined path follows: the reflected light reflected from the measurement surface is output from a center of the dispersive objective lens group, and enters the measurement portion through the light-outgoing hole.

Preferably, the point light source is configured to emit a light beam in a form of whole light beam or annular light beam to the focusing lens, and then the light beam is emitted into the dispersive objective lens group in the form of annular light beams in the first predetermined path and reaches the measurement surface.

Preferably, the optical sampling portion further includes a reflecting mirror located between the dispersive objective lens group and the light-incident hole, the reflecting mirror is arranged on an axis of the dispersive objective lens group, and configured to receive the reflected light output from the dispersive objective lens group and guide the reflected light to the light-outgoing hole.

Preferably, the light source portion further includes a reflecting mirror located between the focusing lens and the light-incident hole, the reflecting mirror is arranged on an axis of the dispersive objective lens group, and configured to receive the reflected light output from the dispersive objective lens group and guide the reflected light to the light-outgoing hole, and the light-outgoing hole and the light-incident hole are the same hole.

Preferably, the light source is a line light source or a point light source, under controls of the light source controller, the broad-spectrum light beam of the line light source is emitted into a single side of the dispersive objective lens group and reaches the measurement surface through the first predetermined path; and the second predetermined path follows: the reflected light reflected from the measurement surface is output from opposite symmetrical sides of the dispersive objective lens group, and enters the measurement portion through the light-outgoing hole, and the light-outgoing hole and the light-incident hole are the same hole.

Preferably, the dispersive objective lens group includes a first-stage dispersive objective lens group located below the light source and a second-stage dispersive objective lens group located below the first-stage dispersive objective lens group.

Preferably, a diaphragm is provided between the first-stage dispersive objective lens group and the second-stage dispersive objective lens group.

Preferably, the measurement portion includes:

a spectrometer, configured to receive and process the reflected light from the optical sampling portion;

a sensor, configured to convert the reflected light from the spectrometer into an electrical signal; and a processor, configured to calculate a measurement result according to the electrical signal of the sensor.

Preferably, the spectrometer includes:

a collimator lens, configured to irradiate the measurement beam emitted from the light-outgoing hole onto the diffraction grating;

a diffraction grating, configured to diffract the substantially collimated measurement beam; and focusing lens, configured to converge reflected light diffracted by the diffraction grating to the sensor.

Accordingly, the present invention provides a spectral confocal measurement method including:

controlling a light source to emit a broad-spectrum light beam with a certain wavelength range in a first predetermined path;

converging the broad-spectrum light beam emitted from the light source on different measurement surfaces of the object to be measured, and outputting reflected light in a second predetermined path that is different from the first predetermined path; and receiving and processing the reflected light and calculating a measurement result.

In comparison with the prior art, a specific optical path is configured in the spectral confocal measurement device and method of the present invention, specifically, the incident measurement beam is emitted along a first predetermined path and reflected along a second predetermined path that is different from the opposite direction of the first predetermined path. In such a way, undesired beams are filtered, so that the purity of the spectrum of the emitted light can be improved, and the measurement accuracy of the subsequent measurement portion is improved accordingly.

The present invention will become clearer through the following description in conjunction with the accompanying drawings, which are used to explain the embodiments of the present invention.

DETAILED DESCRIPTION OF ILLUSTRATED EMBODIMENTS

A distinct and full description of the technical solution of the present invention will follow by combining with the accompanying drawings.

As described above, the essence of the present invention is to provide an improved spectral confocal measurement device and measurement method thereof, which optimizes the light path by controlling the direction of incident light, thereby improving measurement accuracy and reducing production costs.

Figure 1:
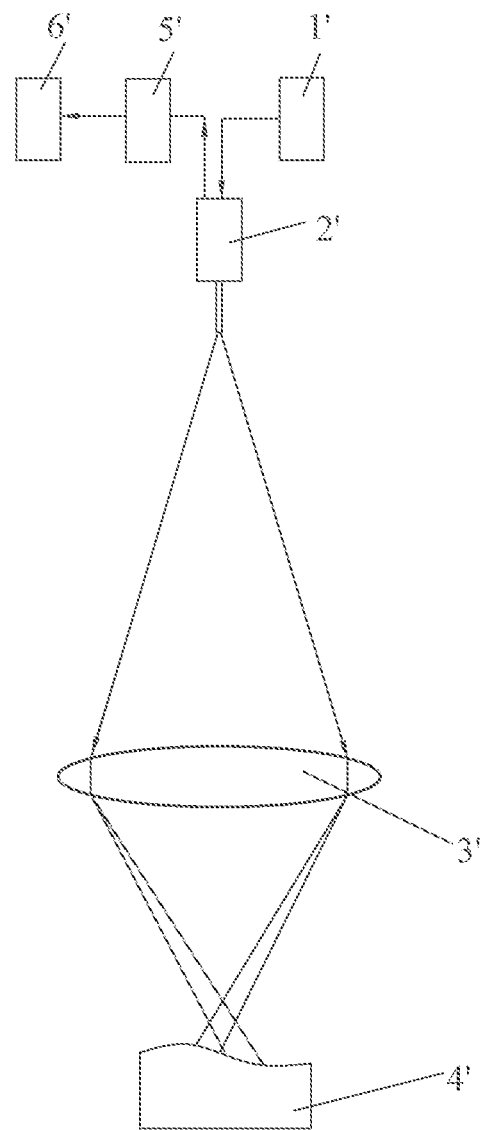
FIG. 1 is a schematic diagram of a conventional spectral confocal measurement device.
Figure 2:
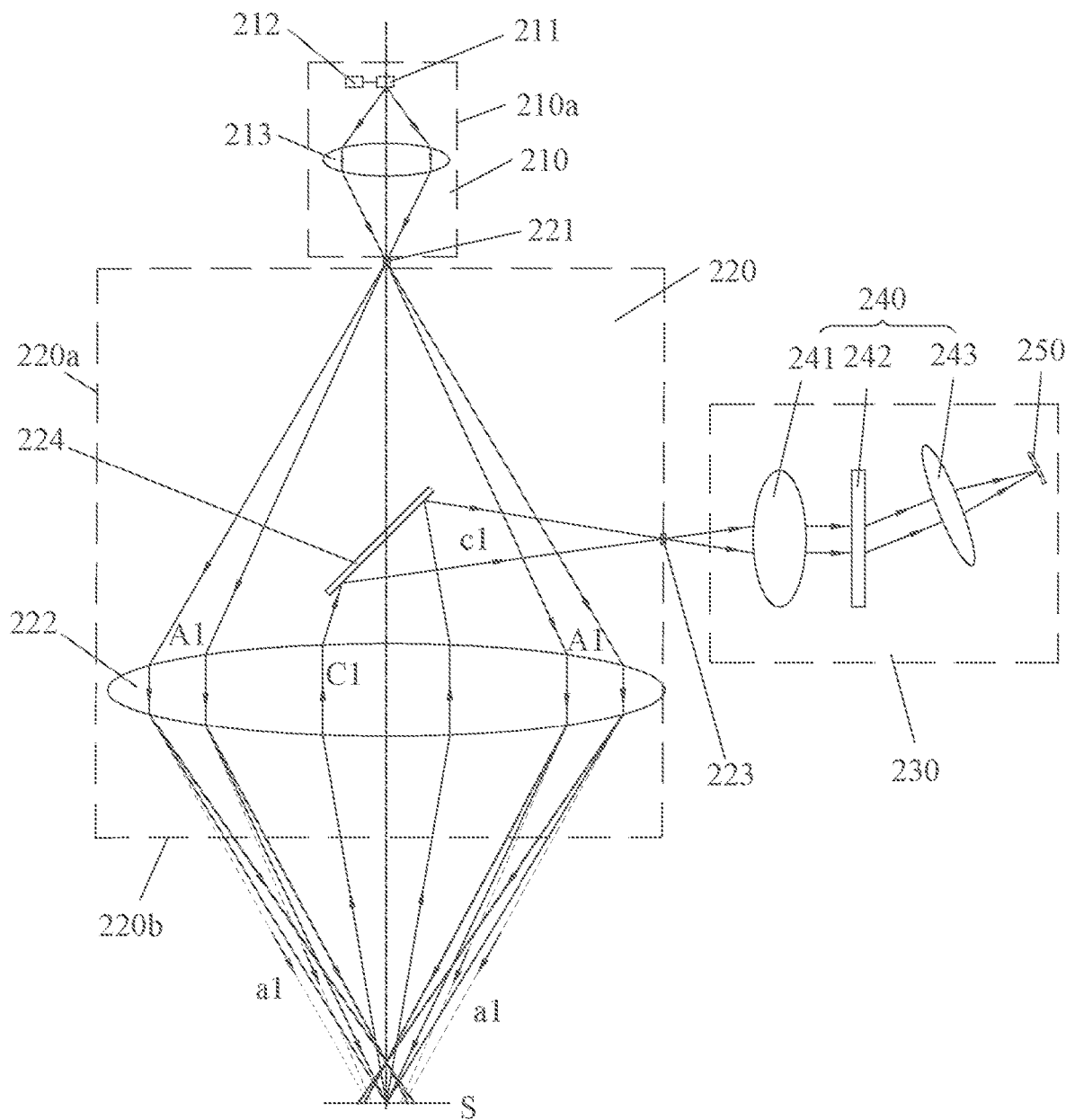
FIG. 2 is a schematic diagram of a spectral confocal measurement device according to a first embodiment of the present invention.

Referring to FIG. 2, a spectral confocal measurement device 200 according to an embodiment of the present invention includes a light source portion 210, an optical sampling portion 220 and a measurement portion 230. Specifically, the light source portion 210 is configured to emit a broad-spectrum light beam with a certain wavelength range in a first predetermined path; the optical sampling portion 220 is configured to converge the broad-spectrum light beam emitted from the light source portion 210 on different measurement surfaces of an object to be measured, and output a reflected light in a second predetermined path that is different from a reverse direction of the first predetermined path; and the measurement portion 230 is configured to receive and process the reflected light from the optical sampling portion 220 to obtain a measurement result.

Specifically, in the embodiment as shown in FIG. 2, the light source portion 210 is encapsulated by a housing 210a and includes a light source 211, a light source controller 212 connected to the light source 211, and a focusing lens 213 located below the light source 211. The light source 211 may be a point light source or a line light source, such as an LED light source, a laser, or other light sources such as mercury vapors. Specifically, the light source 211 is configured to emit continuous visible light beams having different wavelengths from the blue wavelength range to the red wavelength range as the measurement light. The light source controller 220 is configured to control the direction and path of the incident light of the light source, thereby optimizing the direction and the path of the outgoing light. In view of the difference between the point light source and the line light source, the direction and the path of the outgoing light of the present invention are different, which will be described in detail below in conjunction with different embodiments. Since the light beam needs to be focused before entering the optical sampling portion 220, the focusing lens 213 is arranged on the optical sampling portion 220.

The light source portion 210 and the optical sampling portion 220 are connected, by an optical fiber, for example, and a light-incident hole (that is, a port) is provided therebetween, and the light-incident hole is provided at the focal point of the focusing lens 213. Specifically, the optical sampling portion 220 is encapsulated by a housing 220a, and includes a light-incident hole 221, a dispersive objective lens group 222, a light-outgoing hole 223 and a reflecting mirror 224. Specifically, the light-incident hole 221 and the light-outgoing hole 223 are arranged on the housing 220a, the dispersive objective lens group 222 is arranged in the housing 220a, and the reflecting mirror 224 is located between the dispersive objective lens group 222 and the light-incident hole 221, and located at the axis of the dispersive objective lens group 222. Further, the light-outgoing hole 224 is located on the other side of the housing 220a to connect with the measurement portion 230. Optionally, the light-outgoing hole 224 can be a pinhole or an aperture. The shape of the housing 220a of the optical sampling portion 220 can be set according to actual requirements, which is not limited.

Specifically, a measurement beam emitted from the light source portion 210 is emitted to inside of the housing of the optical sampling portion 220 by passing through the focusing lens 213 and the light-incident hole 221, and then passes through the dispersive objective lens group 222 and is emitted to a measurement surface S from an irradiation surface 220b provided at the front end of the housing. The dispersive objective lens group 222 is at least one lens involved in the spectral confocal sensor and configured to generate axial chromatic aberration. Specifically, the dispersive objective lens group 222 is configured to focus the light incident on the optical sampling portion 220 at a focal position of the optical axis corresponding to the wavelength. Therefore, the light beams of different wavelengths contained in the corresponding light source are focused to different focus positions. Generally, the light source includes continuous visible light beams with a certain wavelength range, for example, light beams of red, green and blue are separated from each other and emitted from the irradiation surface of the housing to the measurement surface. It should be noted that, light with other colors and other wavelengths may also be emitted.

Specifically, the measurement beam is reflected by the measurement surface, passes through the dispersive objective lens group 222 to enter the reflecting mirror 224, and then is guided to the light-outgoing hole 223, to reach the measurement portion 230 finally.

Specifically, in one embodiment, the measurement portion 230 includes a spectrometer 240, a sensor 250, and a processor (not shown). The spectrometer 240 is configured to receive and process the reflected light from the optical sampling portion 220, the sensor 250 is configured to convert the reflected light from the spectrometer 240 into an electrical signal, and the processor is configured to calculate a measurement result according to the electrical signal of the sensor 250.

As a preferred embodiment, as shown, the spectrometer 240 includes a collimator lens 241, a diffraction grating 242, and a focusing lens 243. The collimator lens 241 is configured to make the measurement beam emitted from the light-outgoing hole irradiate to the diffraction grating 242 in a substantially collimated manner, the diffraction grating 242 is configured to diffract the substantially collimated measurement beam, and the focusing lens 243 is configured to image the diffracted light diffracted by the diffraction grating 242 on the sensor 250. Normally, +1-order diffracted light is imaged on the sensor 250, but other diffracted light such as of −1-order diffracted light may also be imaged. It should be noted that the specific structure and configuration of the diffraction grating 242 is not limited.

It should be noted that the focusing lens 243 is a lens with small chromatic aberration, and can image diffracted light on the sensor 250 regardless of the wavelength of the measurement light.

The specific structure of the sensor 250 is not limited. For example, a CMOS line sensor or a CCD line sensor can be used. The sensor 250 is configured to convert the measurement light into an electrical signal and transmit the electrical signal to the processor. Based on the received signal, the processor can calculate the position of the object to be measured. The specific calculation method may refer to the prior art, which will not be described in detail here.

The light path control of the present invention will be described in detail below according to several embodiments.

In the embodiment shown in FIG. 2, under the control of the light source controller 212, a measurement beam is emitted from the point light source 211 to enter the focusing lens 213 in the form of a whole light beam (that is, the beam that does not shield any area), and then is focused on the light-incident hole 221 to enter the housing 220a of the optical sampling portion 220, and then enters the dispersive objective lens group 222 in a predetermined direction in a form of an annular light beam (that is, the beam that shields the central area), as shown by the arrow A1 in the figure. It should be noted that, the first predetermined path (that is the light incident path) of the point light source 211 in the disclosure is defined as follow: the light beam from the light source enters the dispersive objective lens group 222 through the light-incident hole 221, and then reaches the measurement surface S. The second predetermined path (that is the light outgoing path) of the point light source 211 in the disclosure is defined as follow: the light beam reflected from the measurement surface S passes through the dispersive objective lens group 222, and then passes through the light-outgoing hole to enter the measurement portion 230. The first predetermined path described herein may refer to a complete or partial light path, and the second predetermined path described herein may refer to a complete or partial light path. In this embodiment, as shown in FIG. 2, the first predetermined path is A1+a1, and the second predetermined path is C1+c1. As shown, taking the measurement surface S of the object as the reference, the dispersive objective lens group 222 is parallel to the measurement surface S, and the measurement beam of the point light source is emitted at a certain angle with the measurement surface S along a predetermined path A1 to the dispersive objective lens group 222. Specifically, the measurement beam is emitted in the form of annular light beam, with the beam at the center being shielded, and then passes through the dispersive objective lens group 222 to reach the measurement surface S, and then the reflected light from the measurement surface S passes through the central part of the dispersive objective lens group 222 along the path of C1, finally, the beam is reflected from the reflecting mirror 224 to the light-outgoing hole 223. It can be seen that the light outgoing path of the measurement beam does not return from the original light incident path, but takes the above-mentioned specific path. In such an arrangement, inconsistent and undesirable beams are filtered, so that the purity of the spectrum of the emitted light can be improved, thereby improving the measurement accuracy of the subsequent measurement portion.

Preferably, the light source 211, the focusing lens 213, the light incident hole 221, the dispersive objective lens group 222, and the measurement surface S and the reflecting mirror 224 are arranged coaxially, that is, their centers are located on the same straight line. In such an arrangement, the volume of the entire spectral confocal measurement device can be reduced, thereby reducing production costs.

In addition, the measurement accuracy is greatly improved by the above-mentioned light path control. The number of dispersive objective lenses in the dispersive objective lens group 222 in the optical sampling portion 220 of the present invention is not limited, and can be set to one or more to meet different design requirements.

Figure 3:
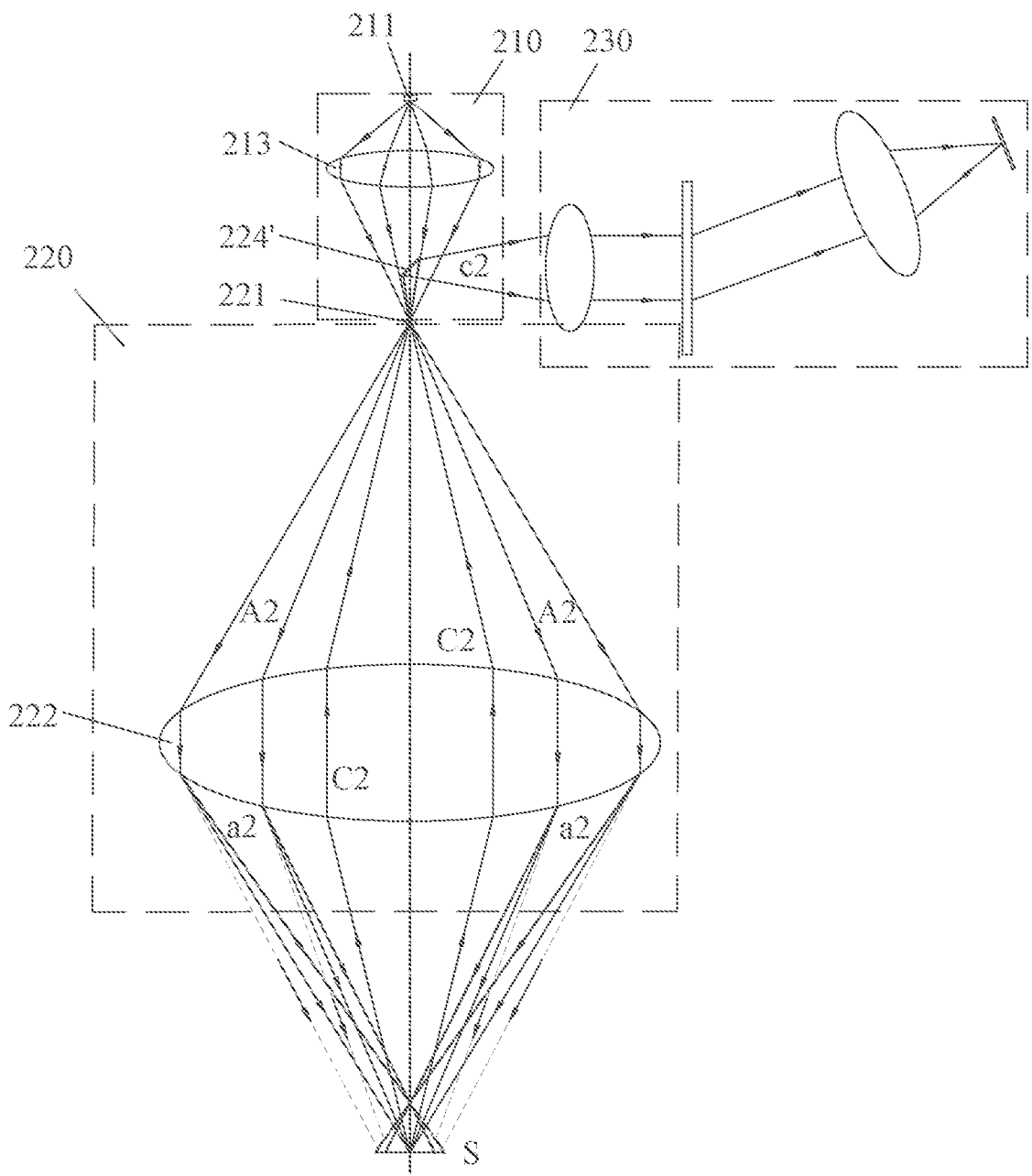
FIG. 3 is a schematic diagram of a spectral confocal measurement device according to a second embodiment of the present invention.

FIG. 3 shows another embodiment of the present invention using a point light source. The differences from the first embodiment include: the light outgoing manner of the point light source 211 before entering the optical sampling portion 220, the arrangement of the light-incident hole, and the arrangement of the reflecting mirror 224' for guiding the light to the measurement portion 230.

Specifically, as shown, the central light of the measurement beam emitted from the point light source 211 is shielded, that is, the measurement beam in the form of annular light beam is emitted into the focusing lens 213, and then is focused on the light-incident hole 221 to enter the housing 220a of the optical sampling portion 220, and then enters the dispersive objective lens group 222 in the form of annular light beam. The specific light incident paths A2 and a2 are the same with the paths A1 and a1 in the above embodiment, but the light outgoing paths are different. Specifically, the reflecting mirror 224' for guiding light in this embodiment is provided at the light source portion 210 instead of the optical sampling portion 220. That is, the reflecting mirror 224' is located between the focusing lens 213 and the light incident hole 221, and the reflecting mirror 224' is arranged on the axis of the dispersive objective lens group 220. In other words, the light-outgoing hole and the light-incident hole in this embodiment are the same hole. When the light outputs, after the measurement beam is reflected from the measurement surface S, the reflected light passes through the center part of the dispersive objective lens group 222 along the path C2, and then passes through the light-incident hole 221 again to enter the reflecting mirror 224' in the light source portion 210, and finally is directly guided to the measurement portion 230 by the reflecting mirror 224'. That is, the light outgoing path of this embodiment includes C2 and c2. Such a specific light path can also filter out non-conforming and undesirable light beams, so that the purity of the spectrum of the emitted light can be improved, thereby improving the measurement accuracy of the subsequent measurement portion. In this embodiment, since the light incident and light reflection share the same light-incident hole, the installation and debugging efficiency is higher therefore.

The measurement portion 230 in this embodiment has the same structure as that in the first embodiment, which will not be repeated here.

Figure 4:
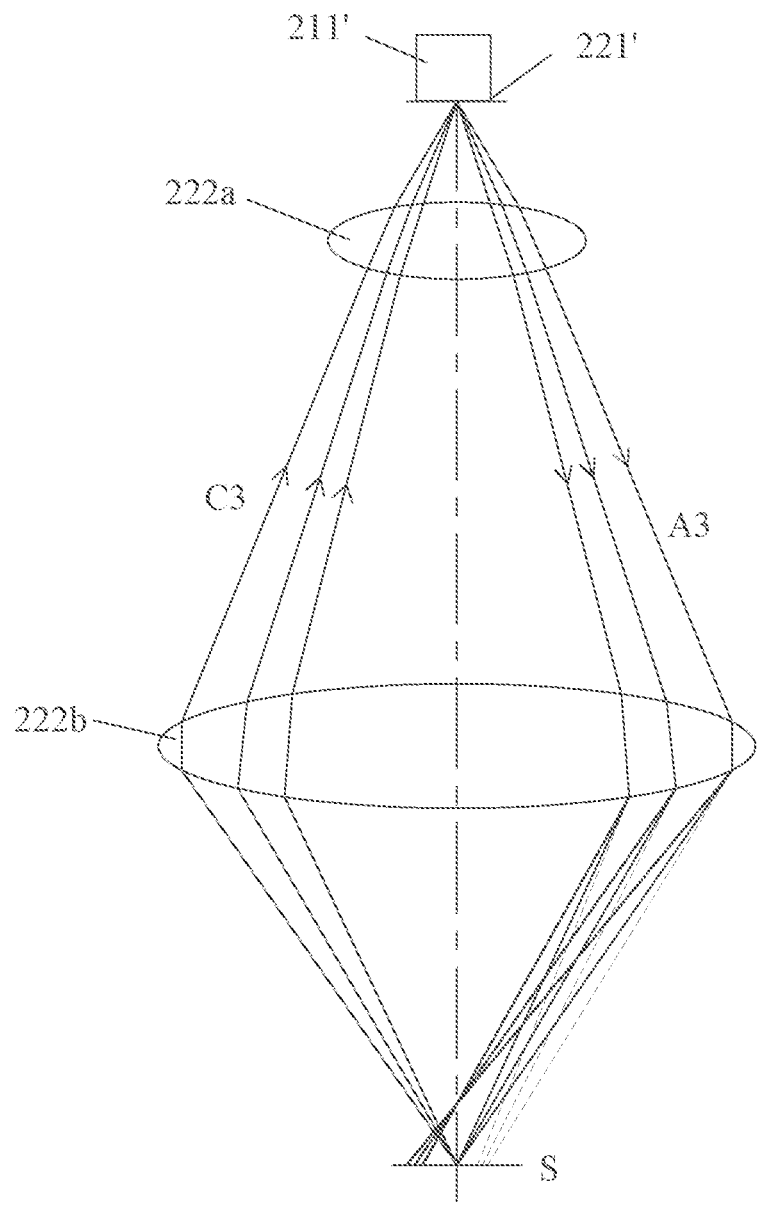
FIG. 4 is a partial schematic diagram of the spectral confocal measurement device according to a third embodiment of the present invention.

As a third embodiment, FIG. 4 shows another measurement structure and light path control. In the embodiment, either a line light source or a point light source can be served as the incident light source. Taking the line light source 211' as an example, differing from the previous two embodiments, a two-stage dispersive objective lens group including a first-stage dispersive objective lens group 222a, a second-stage dispersive objective lens group 222b is included in this embodiment, that is, the first-stage dispersive objective lens group 222a, the second-stage dispersive objective lens group 222 and the measurement surface S are arranged coaxially from up to bottom (as shown in FIG. 4). Under the control of the light source controller, the measurement beam of the linear light source 211' passes through the light-incident slit 221' and only enters the single side of the first-stage dispersive objective lens group 222a and then enter the single side of the second stage dispersive objective lens group 222b along the first predetermined path A3, and reaches the measurement surface S. Subsequently, the measurement beam is reflected from the measurement surface S and emitted from the opposite symmetrical side of the second-stage dispersive objective lens group 222b along the second predetermined path C3, and then is reflected to the light-incident slit 221' of the line light source, and then enters the measurement portion (not shown) located on one side of the light-incident slit 221' for measurement. In this light path control manner, only the beam with a specific wavelength on the confocal line can enter the dispersive lens group through the measurement surface and finally enter the measurement portion (imaging system) through the light-incident slit 221', and the undesirable beam cannot enter the measurement portion. As a result, the interference of other reflection wavelengths outside the confocal line is effectively reduced, so that the test sensitivity is higher and the measurement accuracy is improved. The measurement portion in this embodiment has the same structure as that in the first embodiment, which will not be repeated here.

Figure 5A:
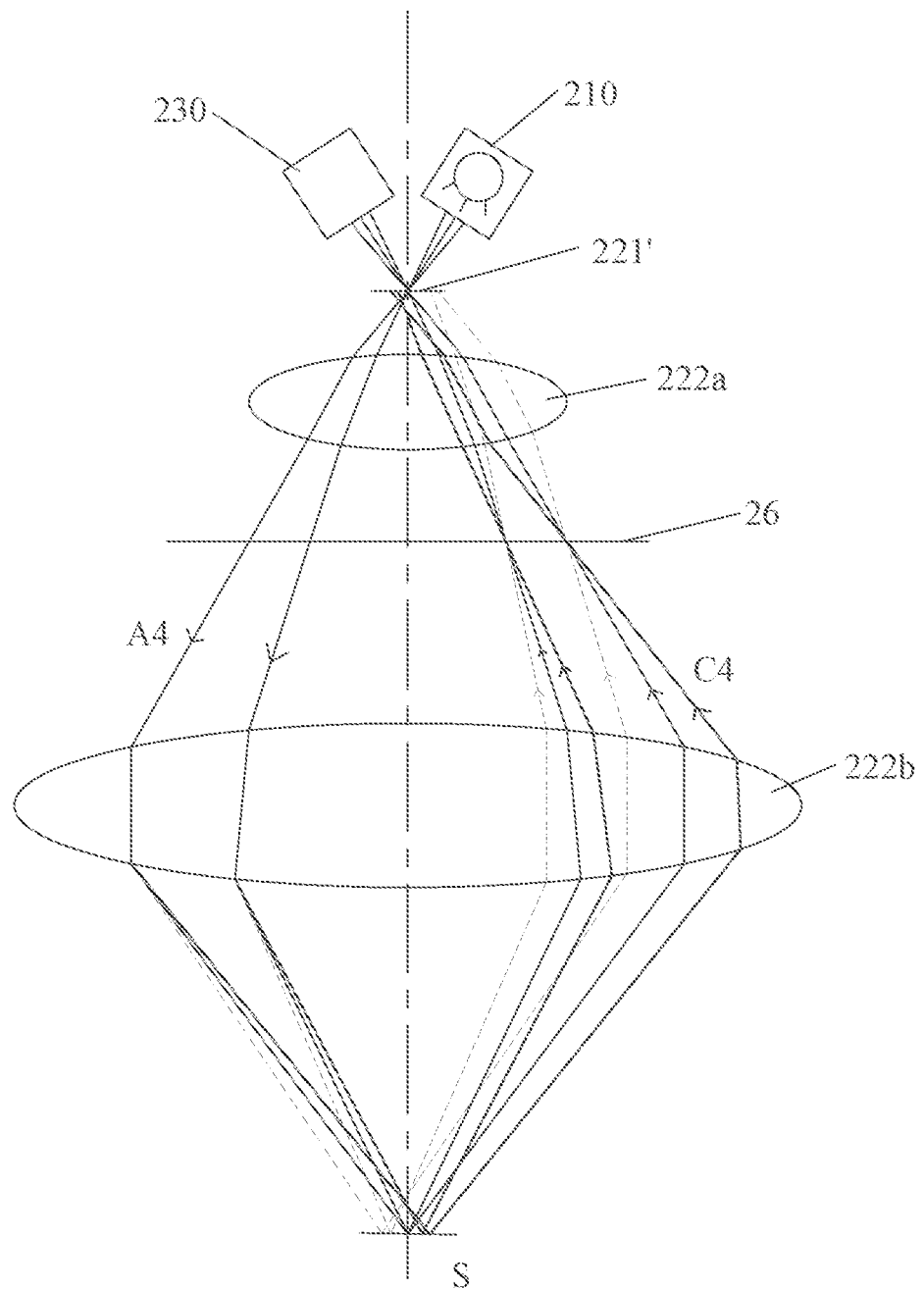
FIG. 5a is a schematic diagram of a spectral confocal measurement device according to a fourth embodiment of the present invention in the X direction.
Figure 5B:
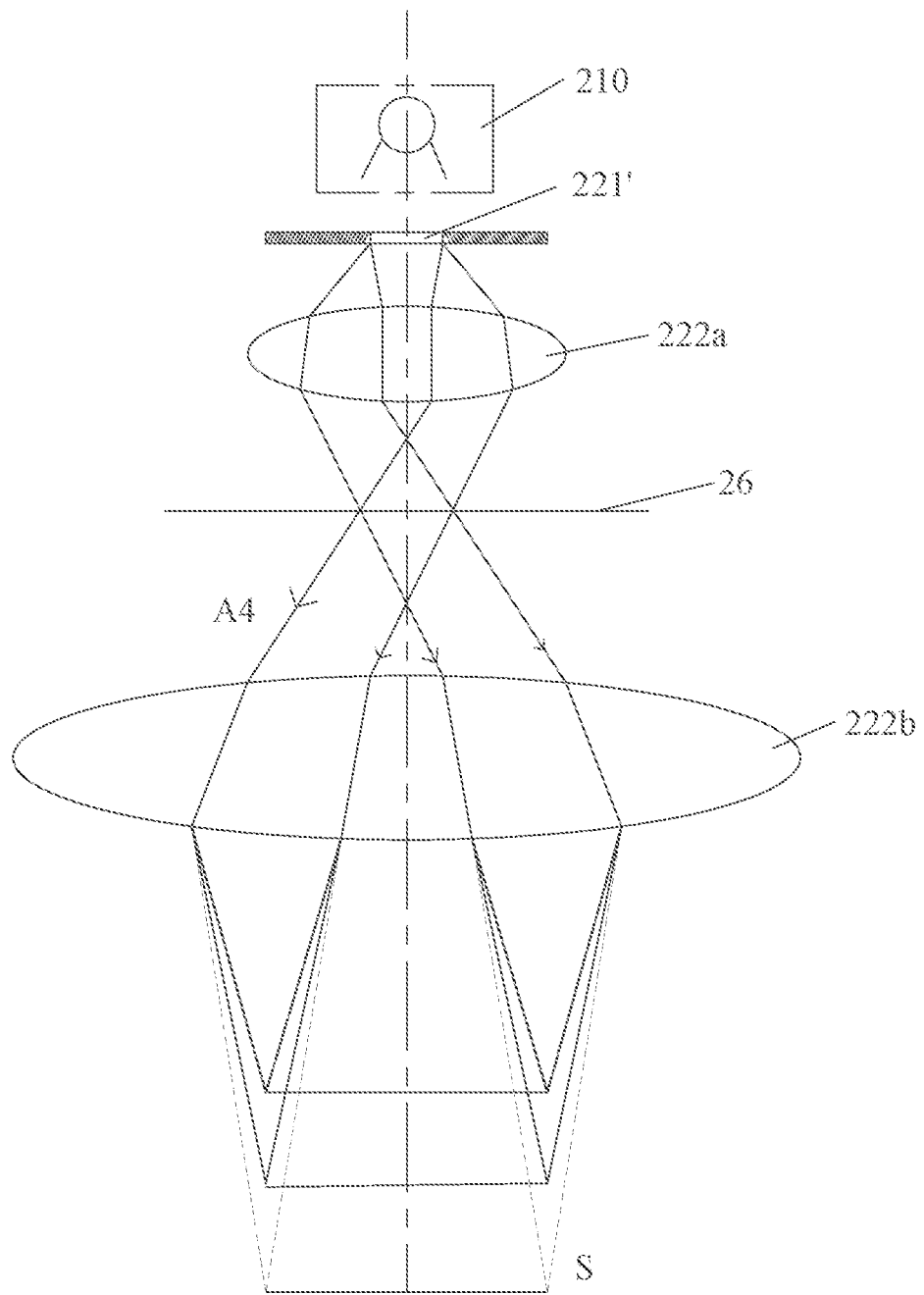
FIG. 5b is a schematic diagram of a spectral confocal measurement device according to the fourth embodiment of the present invention in the Y direction.
Figure 5C:
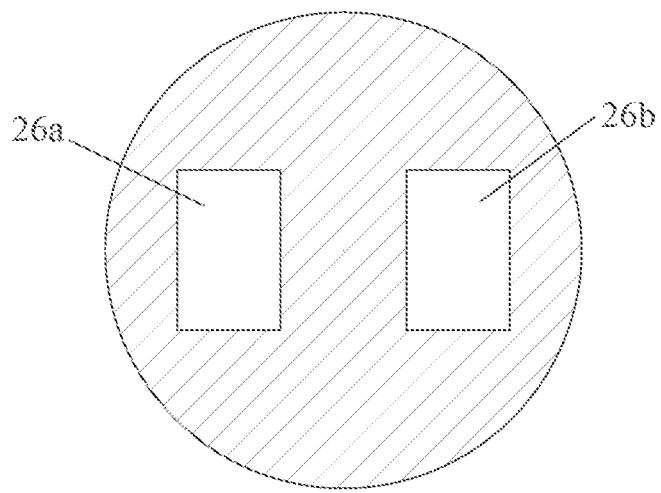
FIG. 5c is a schematic diagram of the structure of the diaphragm in FIGS. 5a-5b.

FIG. 5a-5c show the structure and light path control of another preferred embodiment of the spectral confocal measurement device of the present invention. In this embodiment, the confocal measurement device uses a linear light source. Similarly as the embodiment as shown in FIG. 4, the light source 210 and the measurement portion 230 are located on the same side of the light-incident slit 221', the first-stage dispersive objective lens group 222a and the second-stage dispersive objective lens group 222b are arranged coaxially. Differing from the previous embodiment, a diaphragm 26 is provided between the first-stage dispersive objective lens group 222a and the second-stage dispersive objective lens group 222b. As shown in FIG. 5c, the diaphragm 26 is provided with two channels 26a and 26b, respectively, for allowing the beams to input or output. Preferably, the shape of the two channels is square, but other shapes are also available. With the help of the diaphragm 26, the light incident path and the light reflection path can be effectively separated, so that stray light can be filtered, thereby reducing the interference of other reflection wavelengths beyond the confocal line.

The specific light path control follows. Under the control of the light source controller, the measurement beam of the light source 210 passes through the light-incident slit 221', enters from the single side of the first-stage dispersive objective lens group 222a along the first predetermined path A4, then passes through the light-incident port 26a of the diaphragm 26 to enter the single side of the second-stage dispersive objective lens group 222b, and then reaches the measurement surface S. The measurement beam is then reflected from the measurement surface S and emitted along the second predetermined path C4 from the opposite symmetrical side of the second-stage dispersive objective lens group 222b. Specifically, the reflected beam is emitted from the second-stage dispersive objective lens group 222b, then passes through the light-outgoing port 26b of the diaphragm 26 to pass through the light entrance slit 221', and finally enters the measurement portion 230 located on the side of the light-incident slit 221' to make the measurements.

It is should be noted that, the focusing lens and the reflecting mirror shown in FIGS. 2-3 are not required in this embodiment shown in FIGS. 4 and 5a-5b, and therefore the structure is more simpler.

Figure 6:
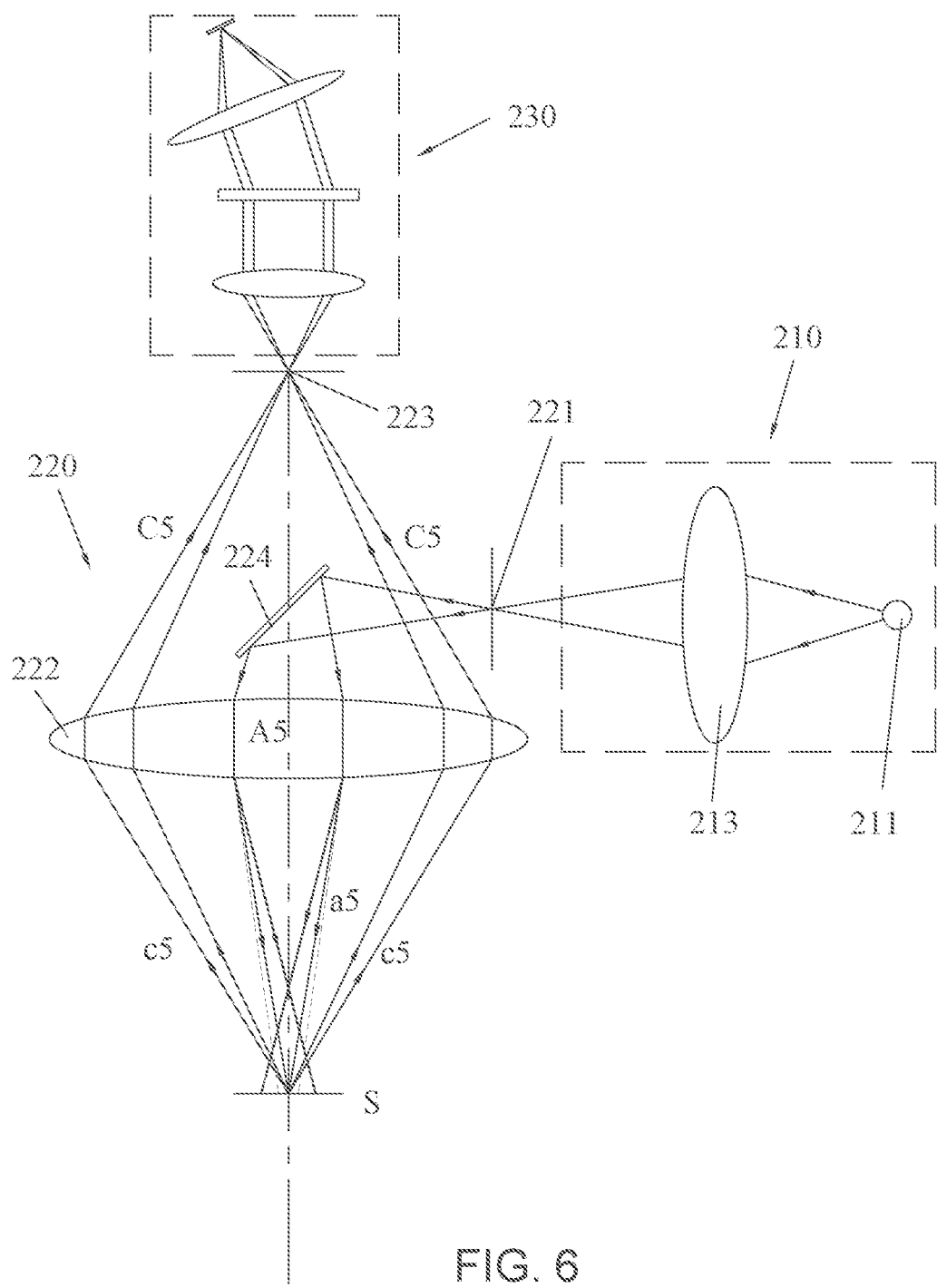
FIG. 6 is a partial schematic diagram of the spectral confocal measurement device according to a fifth embodiment of the present invention.
Figure 7:
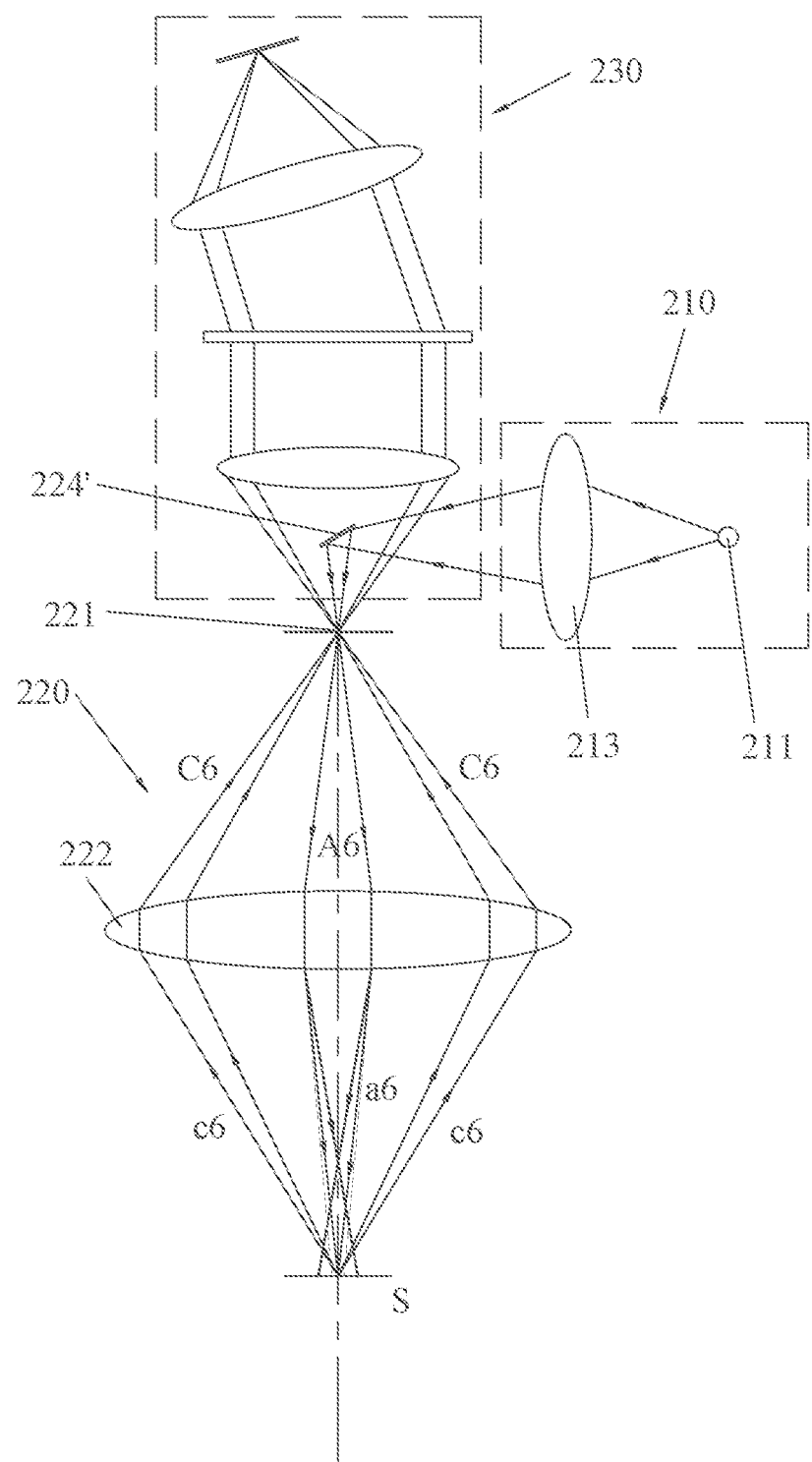
FIG. 7 is a partial schematic diagram of the spectral confocal measurement device according to a sixth embodiment of the present invention.

FIGS. 6 and 7 respectively show the fifth and sixth embodiments of the spectral confocal measurement of the present invention, wherein FIG. 6 is a modified embodiment of FIG. 2, and FIG. 7 is a modified embodiment of FIG. 3. The light path of the two embodiments is opposite to the foregoing path: the dispersive objective lens group is used as the description reference, the measurement beam enters from the central area of the dispersive objective lens group, and the reflected measurement beam is emitted from the outer periphery of the dispersive objective lens group in the form of an annular light beam. The specific light path control and structure follow. The specific light paths in the two embodiments may filter out non-conforming and undesirable light beams, so that the purity of the spectrum of the emitted light can be improved, thereby improving the measurement accuracy of the subsequent measurement portion.

A fifth embodiment shown in FIG. 6 is obtained by interchanging the positions of the light source portion and the measurement portion shown in FIG. 2. That is, the light source 211 in the light source portion 210 emits the measurement beam towards the housing of the optical sampling portion 220 through the focusing lens 213 and the light-incident hole 221, and the measurement beam is reflected by the reflected mirror 224, and then passes through the central part of the dispersive objective lens group 222, and reaches the measurement surface S, as shown the local light incident path indicated by sections A5+a5. Then, the light beam reflected from the measurement surface S passes through the periphery of the dispersive objective lens group in a form of annular light beam, and then enters the measurement portion 230 from the light-outgoing hole 223, as shown the local light outgoing path indicated by C5+c5.

Similarly, a sixth embodiment shown in FIG. 7 is obtained by interchanging the positions of the light source portion and the measurement portion shown in FIG. 3, and the light-incident hole 221 and the light-outgoing hole 221 still share the same hole. It should be noted that the position of the reflecting mirror 224' remains unchanged. As shown in FIG. 7, the light from the light source 211 in the light source portion 210 is focused onto the reflecting mirror 224' through the focusing lens 213, and then is guided through the light-incident hole 221 to enter the interior of the optical sampling portion 220, specifically passes from the central part of the dispersive objective lens group 222 to reach the measurement surface S, as shown the local light incident path indicated by sections A6+a6. Then, the light beam reflected from the measurement surface S passes through the periphery of the dispersive objective lens group in a form of annular light beam, and then enters the measurement portion 230 from light-incident hole 221 again, as shown the local light outgoing path indicated by C6+c6.

Accordingly, the present invention further discloses a spectral confocal measurement method:

controlling a light source to emit a broad-spectrum light beam with a certain wavelength range in a first predetermined path;

converging the broad-spectrum light beam emitted from the light source on different measurement surfaces of the object to be measured, and outputting reflected light in a second predetermined path that is different from the first predetermined path; and receiving and processing the reflected light and calculating a measurement result. For the specific light path control method, please refer to the description of the above embodiments.

In summary, a specific optical path is configured in the spectral confocal measurement device and method of the present invention, specifically, the incident measurement beam is emitted along a first predetermined path and reflected along a second predetermined path that is different from the opposite direction of the first predetermined path. In such a way, undesired beams are filtered, thereby effectively reducing the interference of other reflected wavelengths beyond the confocal line, so that the purity of the spectrum of the emitted light can be improved, and the test sensitivity and measurement accuracy of the subsequent measurement portion are improved accordingly. Moreover, the device has a simple structure to reduce production costs.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A spectral confocal measurement device, comprising:
   a light source portion, comprising a light source and a light source controller connected to the light source, and configured to emit a broad-spectrum light beam with a certain wavelength range in a first predetermined path;
   an optical sampling portion, comprising a light-incident hole, a dispersive objective lens group and a light-outgoing hole, and configured to converge the broad-spectrum light beam emitted from the light source portion on different measurement surfaces of an object to be measured, and output a reflected light in a second predetermined path that is different from a reverse direction of the first predetermined path; and
   a measurement portion, configured to receive and process the reflected light from the optical sampling portion to obtain a measurement result;
   wherein the light source is a line light source or a point light source, under controls of the light source controller, the broad spectrum light beam of the line light source is emitted through the light-incident hole, and then into a first side of the dispersive objective lens group and reaches the measurement surface through the first predetermined path; and the second predetermined path follows: the reflected light reflected from the measurement surface is output from a second side of the dispersive objective lens group that is opposite to the first side, and the reflected light as a whole enters the measurement portion through the light-outgoing hole without dividing into more than one part, and the light-outgoing hole and the light-incident hole are the same hole.

2. The spectral confocal measurement device according to claim 1, wherein the light source portion further comprises a focusing lens located below the light source.

3. The spectral confocal measurement device according to claim 1, wherein the dispersive objective lens group comprises a first-stage dispersive objective lens group located below the light source and a second-stage dispersive objective lens group located below the first-stage dispersive objective lens group.

4. The spectral confocal measurement device according to claim 3, wherein a diaphragm is provided between the first-stage dispersive objective lens group and the second-stage dispersive objective lens group.

5. The spectral confocal measurement device according to claim 4, wherein the diaphragm is provided with two channels respectively for allowing the broad-spectrum light beam to input or output.

6. The spectral confocal measurement device according to claim 5, wherein a shape of the two channels is square.

7. The spectral confocal measurement device according to claim 1, wherein the measurement portion comprises:
   a spectrometer, configured to receive and process the reflected light from the optical sampling portion;
   a sensor, configured to convert the reflected light from the spectrometer into an electrical signal; and
   a processor, configured to calculate a measurement result according to the electrical signal of the sensor.

8. The spectral confocal measurement device according to claim 7, wherein the spectrometer comprises:
   a collimator lens, configured to irradiate the measurement beam emitted from the light-outgoing hole onto the diffraction grating;
   a diffraction grating, configured to diffract the substantially collimated measurement beam; and
   focusing lens, configured to converge reflected light diffracted by the diffraction grating to the sensor.

9. A spectral confocal measurement method, comprising:
   controlling a light source to emit a broad-spectrum light beam with a certain wavelength range in a first predetermined path;
   converging the broad-spectrum light beam emitted from the light source on different measurement surfaces of an object to be measured, and outputting reflected light in a second predetermined path that is different from the first predetermined path, wherein a broad-spectrum light beam is emitted through a light-incident hole, and then into a first side of a dispersive objective lens group from the light-incident hole and reaches one of the measurement surfaces through the first predetermined path, and the reflected light reflected from the measurement surface is output from a second side of the dispersive objective lens group that is opposite to the first side, and the reflected light as a whole enters a measurement portion through a light-outgoing hole without dividing into more than one part, and the light-outgoing hole and the light-incident hole are the same hole; and
   receiving and processing the reflected light and calculating a measurement result.

* * * * *